United States Patent [19]
Quinzer

[11] 3,882,632
[45] May 13, 1975

[54] MODEL AIRCRAFT CONTROL
[76] Inventor: Milbert Quinzer, Rt. No. 2, Meridian, Idaho 83642
[22] Filed: Jan. 2, 1974
[21] Appl. No.: 430,268

[52] U.S. Cl.................................. 46/77; 74/501 R
[51] Int. Cl................................................ A63h 27/04
[58] Field of Search................. 46/74, 77; 74/501 R

[56] References Cited
UNITED STATES PATENTS
3,110,126  11/1963  Kretzmer................................ 46/77
3,375,605  4/1968  Gallagher............................... 46/77
3,696,550  10/1972  Troxell................................... 46/77

*Primary Examiner*—Samuel Scott
*Assistant Examiner*—Frank H. McKenzie, Jr.
*Attorney, Agent, or Firm*—John W. Kraft; Charles L. Kraft

[57] ABSTRACT

The model aircraft control for model aircraft comprises a handle housing, an elevator control group and a throttle control group, the elevator and throttle control groups being interconnected by means of linkages to balance differential forces applied to respective controls during operation of the aircraft.

1 Claim, 6 Drawing Figures

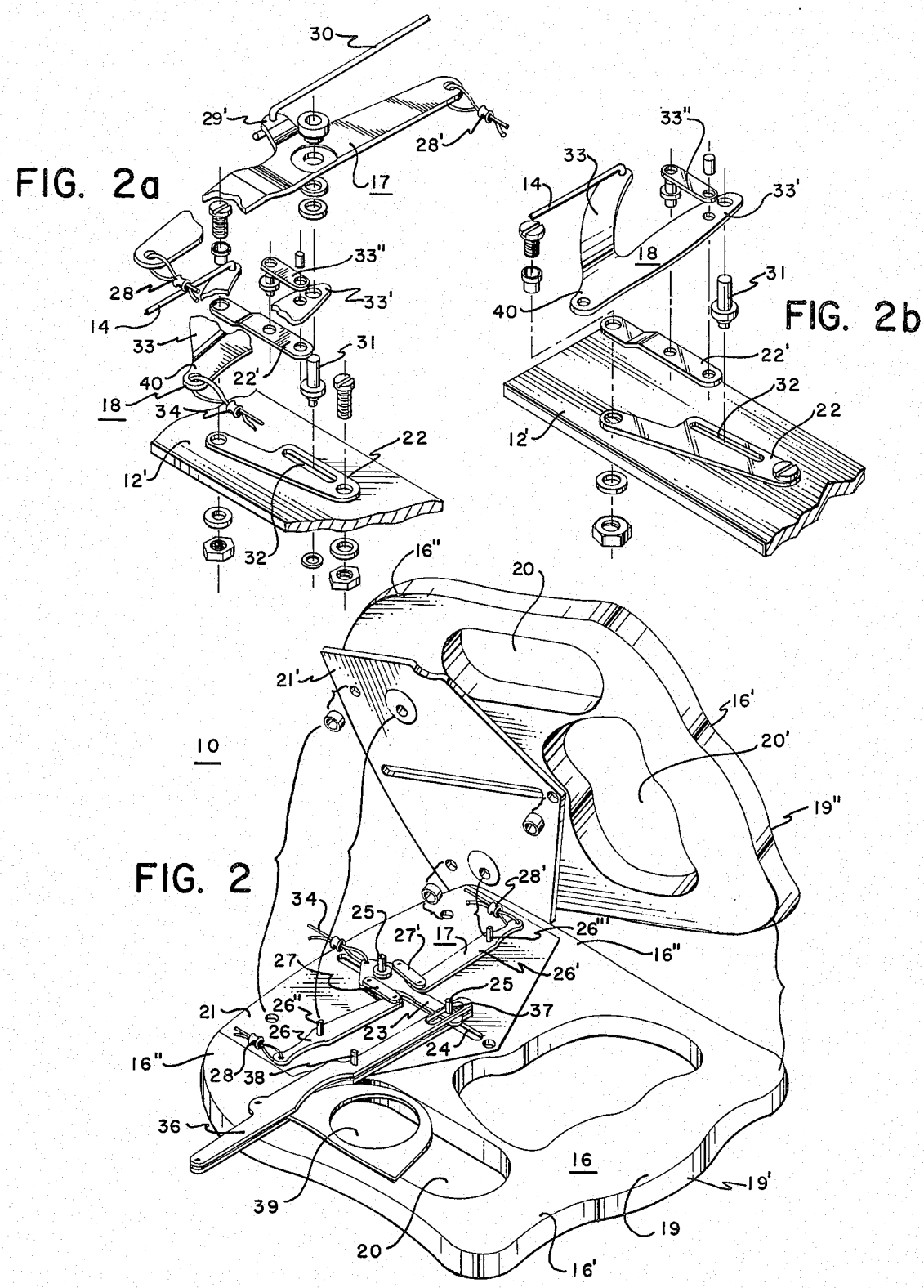

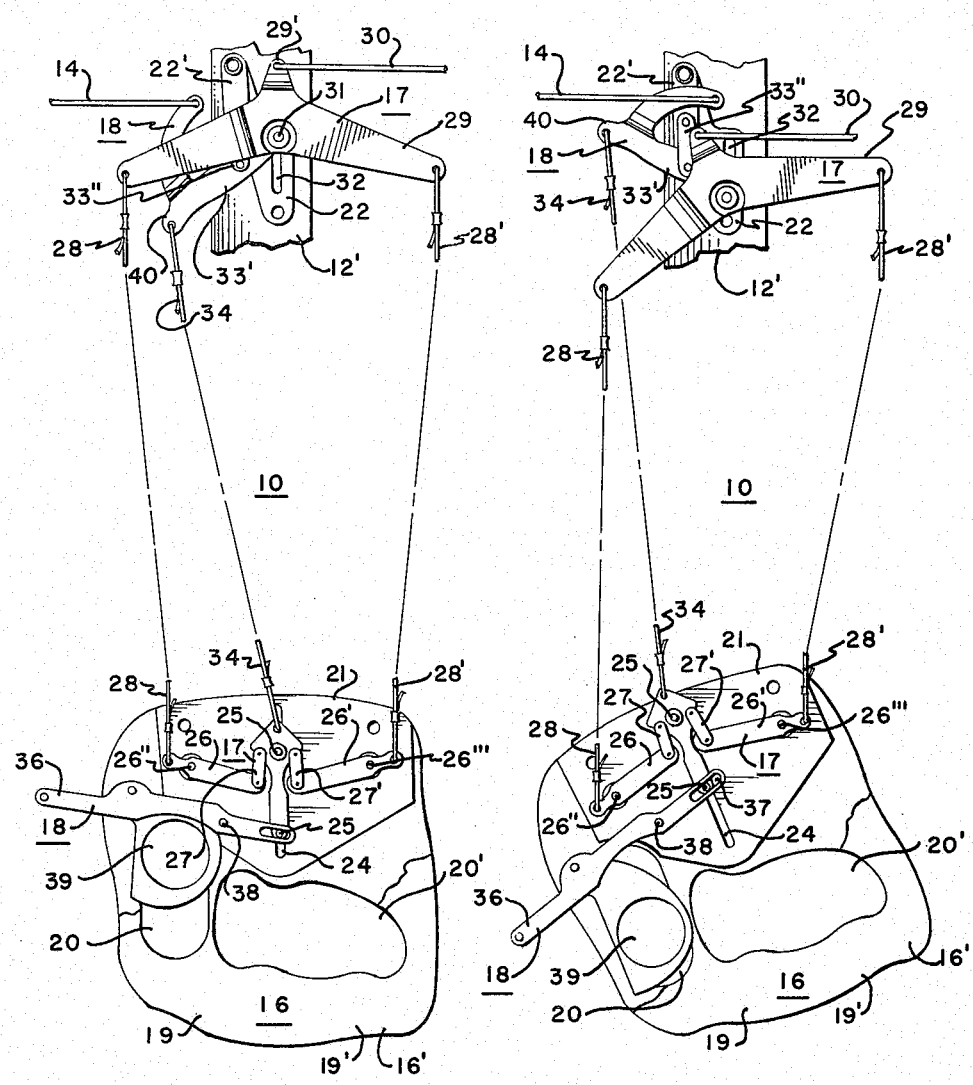

MODEL AIRCRAFT CONTROL

FIELD OF INVENTION

The present invention relates to model airplane controls and more particularly to hand-held model airplane controls.

DESCRIPTION OF THE PRIOR ART

In flying model airplanes where the airplane is controlled by the operator on the ground and where the operator manually holds one or more wires attached to the plane, it has heretofore been considered feasible to have the airplane held by more than two lines for the reason that sudden variations in the course of the airplane during its flight would result in the airplane getting out of control. It has also been found that, among the most popular hand-held-model-airplane controls, there is no provision on the handle for controlling the speed of the motor of the aircraft. Where such controls are provided there is a tendency that an adjustment in the elevator or the throttle will unbalance control of the other control system. Such handles, as are provided with both a throttle control and some control line balancing mechanism, have tended to be quite complicated and fundamentally insensitive for the purposes of model aircraft control. Further, it has been found that, where realism between the control stick and the throttle of the full sized aircraft are sought, the handle is provided with only a pull ring for the throttle and a handle structure resembling more of a leverage grip than a control mechanism; the pull ring typically not being sufficient in the grip hand to control the throttle control with sufficient sensitivity for this purpose.

Accordingly, it is an object of the present invention to provide a mechanical equalizing means whereby an equal pull or tension can be maintained on three separate control lines regardless of the manipulation operation of their respective controls through their medium.

Another object of this invention is to provide practical means by which the motor speed of the model aircraft can be varied as and when desired while the aircraft is in flight.

It is still another object of this invention to provide an approved aircraft flight control means which will be simple to manufacture, to install and to operate.

It is a primary object of this invention that the present model aircraft control provides control to the elevators and to the motor with great sensitivity, wherein sensitivity is built into the aforesaid control means.

These and other objects shall become apparent from the description following, it being understood that modifications may be made without affecting the teachings of the invention here set out.

SUMMARY OF THE INVENTION

The model aircraft control for model aircraft comprises a handle housing, an elevator control group and a throttle control group, the elevator and throttle control groups being interconnected by means of linkages to balance differential forces applied to respective controls during operation of the aircraft.

A more thorough and comprehensive understanding may be had from the detailed description of the preferred embodiment when read in connection with the drawings forming a part of this specification.

BRIEF DESCRIPTION OF THE DRAWINGS

FIG. 2 is an exploded perspective view of the control handle assembly, including that portion of the control housing assembly mounted remotely in a model airplane designated in FIG. 2a.

FIG. 2a is an exploded perspective view of the control handle assembly portion remotely mounted in a model airplane.

FIG. 2b is an exploded perspective view of the U-shaped plate and respective collective links.

FIG. 3 is a top plan view of the handle assembly and the control arms of the actuator linkages, shown in one of the operating positions.

FIG. 4 is a top plan view of the apparatus of the FIG. 3 shown in a second operating position.

Figure 1:
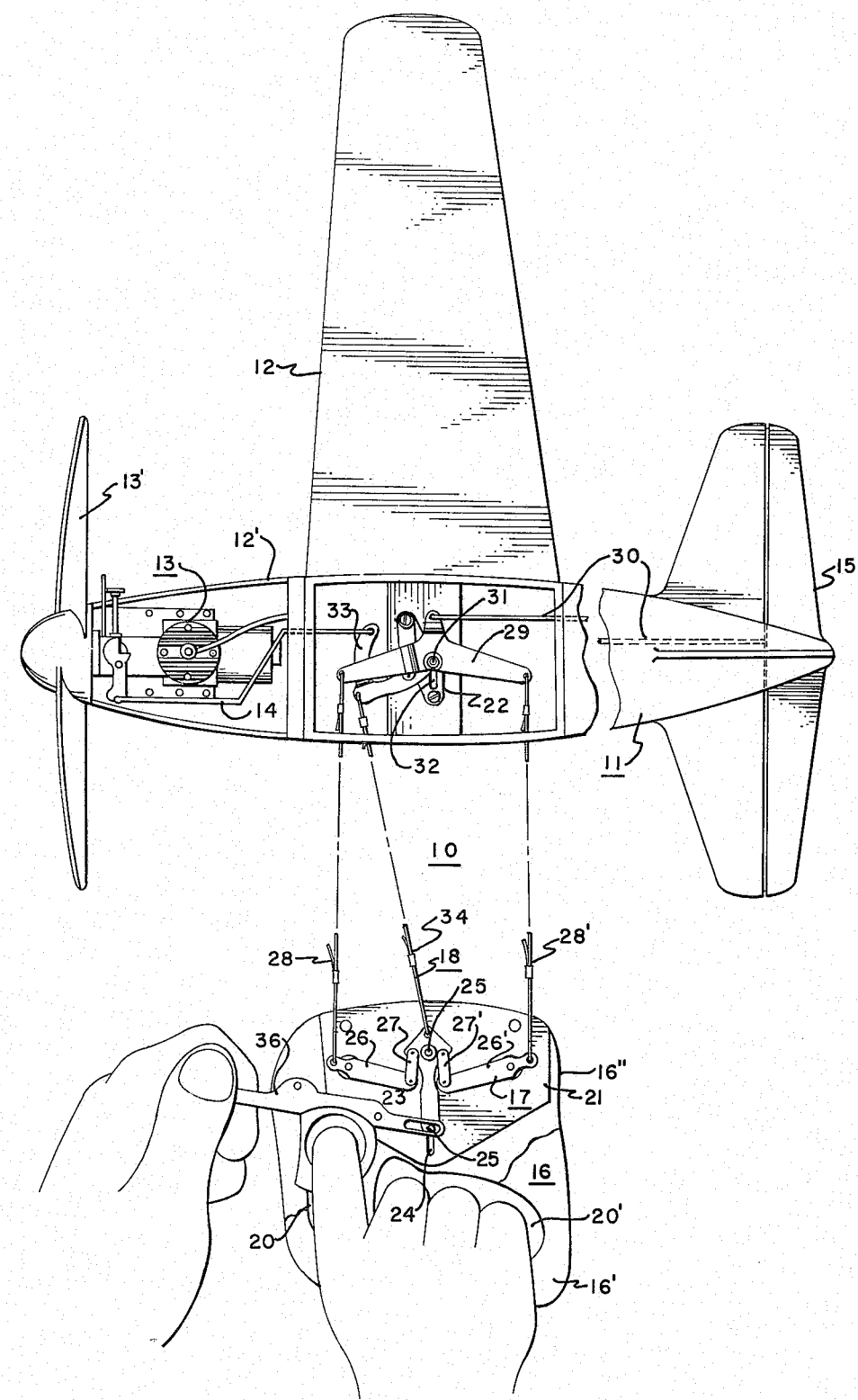
FIG. 1 is a fragmentary top plan view of the controller apparatus for model airplanes of this invention shown with the top wall of the model airplane broken away and one of the side walls of the housing handle removed for illustrative purposes.

DETAILED DESCRIPTION OF THE PREFERRED EMBODIMENT:

Referring now to the drawings and more particularly to the FIG. 1, the model aircraft control of this invention is shown to advantage and generally identified by the numeral 10. The model aircraft control 10 is associated with the model aircraft 11 having, in addition to wings 12 and a fuselage 12', a motor assembly 13 including a propeller 13' and a throttle valve lever 14, and a pivotally mounted elevator 15. As shown in the FIGS. 1 and 2, the model aircraft control 10, itself, comprises a housing-handle 16, an elevator control group 17, and a throttle control group 18.

The housing-handle 16 is operable to provide support and protective covering for elements of the groups 17 and 18, and a handle member 19 which may be conveniently grasped. The housing-handle 16 is fabricated in complementary section halves 19' and 19" which approximately follow a line of cut corresponding to the centerline of the thickness dimension of the housing 16. The halves 19' and 19" form a grip portion 16' and housing portion 16". The grip portion 16' has a loop configuration forming a cavity 20 into which the index finger may be disposed and a cavity 20' which may receive the three remaining fingers of the controller's hand. The grip 16' may be grapsed by wrapping the fingers, as set out above, within the cavities 20 and 20' and by disposing the thumb in the opposite direction about the loop between the index and little fingers at the portion dividing the cavities 20 and 20' with the grip portion 16'. Knurling (not shown) or finger recesses (not shown) may be provided to insure grasping of the grip portion 16'. The housing portion 16" forms a hollow envelope into which the operating elements of the groups 17 and 18 are disposed, and may include metal inserts 21 and 21' fastened to the interior faces of the section halves 19' and 19" respectively. The inserts 21 and 21' provide reinforcing and mounting means for the elements of the groups 17 and 18 in the housing 16. Spacers 21" may be provided between section halves 19' and 19" to permit movement of the operating mechanisms. The elements of the groups 17 and 18 carried in the aircraft 11 are mounted on a plate 22 disposed substantially at the center of the gravity of the aircraft fuselage 12'.

Having thus described housing and mounting means of the model aircraft control 10, the elevator control group 17 includes a center bar 23 disposed in substantial alignment with the radius formed by the model aircraft 11 between the handle 16. The center bar 23 is slidably mounted in a slot 24 which is disposed centrally in the inserts 21 and 21', in alignment with the aforesaid radius. Accordingly, the center bar 23 is provided at each of its terminal ends with bosses 25 which ride within the slot 24. A pair of radius arms 26 and 26' is disposed distally from the terminal end adjacent the aircraft and is projected sidewardly from the bar 23. Each of the radius arms 26 and 26' are connected distally from the forwardmost terminal end of the center bar 23 by links 27 and 27', pivotally fastened between the arm 26 and bar 23 and the bar 26' and the bar 23, respectively, with the links 27 and 27' disposed toward the center bar 23. The arms 26 and 26' are pivotally carried by inserts 21 and 21', by means of pivot pins 26" and 26"' respectively, disposed distally from the outermost terminal ends of the arms 26 and 26'. Control cables 28 and 28' are fastened to the outer terminal ends of radius arms 26 and 26', respectively.

The aircraft 11 is provided with a pivotally mounted T-plate 29 having its central leg disposed transversely of the fuselage 12' and away from the housing-handle 16. It may be seen that the arms of the T-plate 29 are slightly angularly disposed to one another toward the housing-handle 16. The outermost terminal ends of the T-plate 29 are connected to the parallelly disposed cables 28 and 28'. The upstanding leg 29' of the T-plate 29 is pivotally secured to a linkage 30 which is in turn suitably connected to the elevator 15. The T-plate 29 is pivotally carried at its center or fulcrum point on a pin 31 which is, itself, slidably carried in a slot 32 which is cut transversely of the fuselage 12' in the mounting plate 22. Referring to FIGS. 2, 2a and 2b, an asymmetrical U-shaped plate 33, having one leg 33' longer and somewhat straighter than the other in the manner of a hook, is fastened at the terminal end of the longer leg 33' on the pin 31, between the T-plate 29 and the mounting plate 22. The U-shaped plate 33 is disposed between a proportioning link 33" and a connecting portion 22'. The proportioning link 33" is pivotally fastened at one end distally from the terminal end of the longer leg 33' of the U-plate 33 and distally from the terminal end of the connecting portion 22'. The proportioning link 33" has its opposite end pivotally fastened to the link 22'.

Referring again to the handle-housing 16, the throttle control group 18 includes a throttle control cable 34 fastened to the terminal end adjacent the aircraft 11 of the center bar 23, and an operating lever 36. The operating lever 36 is mounted to the terminal end adjacent the grip portion 16' of the center bar 23, and projects sidewardly in the direction of the index finger cavity 20 and out of the handle-housing 16. The operating lever 36 is provided at its end portion connecting the center bar 23 with a rectilinearly disposed slot 37 which rides over the boss 25 fastened at the aforesaid terminal end of the center bar 23. The operating lever 36 is pivotally fastened on a pin 38 in the housing portion 16' distally from the cavity 20. A finger pull ring 39 is provided centrally in the terminal side of the operating lever 36, in registry with the index finger cavity 20. The portion of the operating lever 36 which projects from the exterior of the housing-handle 16 may be provided with knurling or other suitable grip means.

A throttle control cable 34 is connected at its end opposite the center bar 23 to a projecting portion 40 which is disposed from the base of the U-shaped plate 33 which is disposed at a slight angle to the rectilinear axis of the fuselage 12' in the direction of the handle 16. The throttle linkage 14 is pivotally connected to the terminal end of the shorter leg of the U-shaped plate 33 which is disposed substantially transversely of the fuselage 12' to thereby dispose the linkage 14 generally parallel with the rectilinear axis of the fuselage 12'.

In operation and shown to advantage in the FIGS. 4 and 5, the elevators 15 may be actuated by articulating the handle-housing 16 with respect to the transverse axis of the aircraft 11. This causes the T-plate 29 to rotate on the pin 31. The pivoting of the T-plate 29 would, thus, not affect the position of the throttle linkage 14. Alternatively, the operating lever 36 may be actuated to move the center bar 23 in the slot 24 thus actuating the U-shaped plate 33 and the throttle linkage 14. The relative lengths of the cable 34 and the cables 28 and 28' are thus changed, and must be equalized to provide effective control of the aircraft 11 and the throttle control 18. As the center bar 23 is actuated in the slot 24 the links 27 and 27' are actuated to rotate the radius arms 26 and 26' on the pivots 26" and 26"', thus pulling the control cable 28 and 28' in simultaneous movement with the control cable 34 causing the U-shaped plate 33 to pull on the link 22' which is attached to the mounting plate 22. This results in movement of the pin 31 in the slot 32 of the mounting plate 22, and most importantly changes the position of the T-plate 29. This tends to equalize the length of the cables and maintain true tension to each of the cables 28 and 28' and of the throttle control 18. The proportioning link 33" limits the movement of the U-shaped bracket 33 and the connecting portion 22'. It may be seen that the present control 10, having the aforedescribed leverages and connection, results in sensitivity not found in control handles, including balancing control handles of the prior art.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. In combination with model aircraft having wings, fuselage, a motor assembly and throttle valve lever, and a pivotally mounted elevator, a control comprising:

a handle housing being fabricated in complementary section halves which follow a line of cut corresponding to the center line of the thickness dimension of said housing, said halves forming a grip portion having a cavity into which the index finger maybe disposed and a second cavity into which the remaining fingers of the controller maybe disposed, and a hollow housing portion including a center bar disposed in substantial alignment with the radius formed by said model aircraft, said center bar being slidably mounted in a slot disposed in said housing portion along where said radius, a pair of radius arms being disposed distally from the terminal end adjacent said aircraft and projected sidewardly from said center bar and being pivotally mounted at the terminal end opposite said center bar to said handle portion, said radius arms and said handle bar being pivotally connected by links, said handle-housing including operating lever disposed journally perpendicularly to said center bar to the side of said handle housing having said index finger cavity and being pivotally mounted distally adjacent said index finger housing, said operating lever having a rectilinearly disposed slot in its terminal end opposite said pivot point to ride on a pin of the terminal end opposite of center bar opposite said radius arms, said operating lever being provided with a portion projecting from the exterior side of said housing as a handle and with a finger pull ring fastened to the terminal side of said operating lever adjacent said grip portion in registry with said index finger cavity;

said aircraft a T-plate having its central leg disposed transversely of said fuselage away from said housing-handle and the arms of said plate being slightly angularly disposed toward said housing handle, said T-plate being carried at its center or fulcrum point on a pin which is itself slidably carried in a slot which is cut transversely of said fuselage, an asymmetrical U-shaped plate having one leg longer and somewhat straighter than the other in the manner of a hook, and being fastened on the terminal end of the longer leg on said pin fastening and between said T-plate and said portion of said fuselage having said slot, said hooked portion of said U-shaped plate being disposed forwardly with respect to said mounting slot, and a link pivotally fastened distally from the terminal end of said longer leg of said U-shaped plate and a connecting portion which projects away from said housing handle and forwardly with respect to said fuselage;

control lines including a pair of elevator control lines fastened substantially parallelly from corresponding ends of said radius arms and the terminal end of said arms of said T-plate and a connecting rod connecting said central portion of said T-plate to said elevator or actuating said elevator and a throttle control cable fastened to the terminal end adjacent said aircraft of said center bar to the terminal end of said shorter leg of said U-shaped plate adjacent said housing-handle, the terminal end opposite said control cable of said shorter leg being connected to said throttle valve lever.

* * * * *